(12) United States Patent
Van Order

(10) Patent No.: US 6,247,820 B1
(45) Date of Patent: Jun. 19, 2001

(54) ELECTRO-OPTIC MIRROR WITH CONTRASTING DISPLAY

(75) Inventor: Kim Van Order, Hamilton, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 08/387,583

(22) Filed: Feb. 13, 1995

(51) Int. Cl.[7] .................................................. G02F 1/17
(52) U.S. Cl. .......................... 359/604; 359/267; 359/270
(58) Field of Search ............................ 359/70, 71, 79, 359/601–608, 268–277, 265–267; 345/105

(56) References Cited

U.S. PATENT DOCUMENTS

| | | | |
|---|---|---|---|
| Re. 32,576 | 1/1988 | Pastore | 359/636 |
| 3,317,906 | 5/1967 | Balbridge | 340/366 |
| 4,129,861 * | 12/1978 | Giglia | 359/265 |
| 4,184,751 * | 1/1980 | Nicholson | 359/267 |
| 4,192,581 * | 3/1980 | Yaguchi et al. | 359/273 |
| 4,210,390 * | 7/1980 | Yaguchi | 359/273 |
| 4,479,121 * | 10/1984 | Tabata | 359/267 |
| 4,482,216 * | 11/1984 | Hashimoto et al. | 359/268 |
| 4,499,451 | 2/1985 | Suzuki et al. | 362/83.1 |
| 4,588,267 | 5/1986 | Pastore | 359/636 |
| 4,630,904 | 12/1986 | Pastore | 359/636 |
| 4,882,565 | 11/1989 | Gallmeyer | 359/839 |
| 4,940,315 * | 7/1990 | Demiryont | 359/274 |
| 4,953,305 | 9/1990 | Van Lente | 33/356 |
| 5,189,537 | 2/1993 | O'Farrell | 359/71 |
| 5,253,109 | 10/1993 | O'Farrell et al. | 359/604 |
| 5,285,060 | 2/1994 | Larson et al. | 250/214 AL |
| 5,406,414 * | 4/1995 | O'Farrell et al. | 359/604 |
| 5,416,313 * | 5/1995 | Larson et al. | 250/214 AL |

* cited by examiner

Primary Examiner—Kenneth B. Wells
(74) Attorney, Agent, or Firm—Price, Heneveld, Cooper, DeWitt & Litton

(57) ABSTRACT

An electro-optic display system includes a display patterned on at least one of the conductive layers of an electro-optic device. Voltages can be applied to individual display segments of the display to create a contrast with the rest of the electro-optic medium to enable information to be displayed. In a preferred embodiment this display is incorporated into a rearview mirror of a vehicle to display information during day and night conditions.

36 Claims, 2 Drawing Sheets

ELECTRO-OPTIC MIRROR WITH CONTRASTING DISPLAY

BACKGROUND OF THE INVENTION

The present invention relates to an electro-optic display system that is especially useful for mirrors in the automotive vehicle environment.

Rearview and sideview mirrors for a vehicle such as an automobile are standard equipment which allow the driver to observe surrounding traffic. Although such mirrors are very helpful, they can become a nuisance at night due to glare reflected into the eyes of the driver by the headlights of following vehicles. To solve this problem, in the past rearview mirrors were adjustable to two positions to provide day and night modes. The day mode position operates as a normal mirror, reflecting substantially all of the light to the driver. In the night mode position, the mirror is tilted to reflect only a portion of the incoming light, thus reducing objectionable headlight glare. Although this type of mirror alleviates the problem, it must be either manually adjusted by the driver or an expensive motor drive and sensing system is employed.

The two-position adjustable rearview mirror can be replaced by an automatically adjusting electro-optic mirror, the structure and operation of which are known in the art. An electro-optic mirror has an electro-optic medium, the ability of which to transmit light can be increased or attenuated depending on the strength of an applied electrical field. The electro-optic medium typically consists of either electrochromic or polymer dispersed liquid crystal (P.D.L.C.) material. If electrochromic material is used, the medium is normally in a clear state and is darkened by application of an electric field. If P.D.L.C. material is used, the medium is normally in a darkened state and is cleared by application of an electric field. The electro-optic medium is located in the mirror between front and rear transparent conductive layers to which the electric field is applied. A reflective layer is positioned behind the rear conductive layer such that its reflective surface faces forwardly towards the electro-optic medium. The mirror so formed includes an electrical control circuit to automatically adjust the transmissivity of the medium depending on the intensity of light sensed by photodetectors. If a photodetector senses "day" conditions, then, depending on the type of electro-optic material used, an electric field is or is not applied across the electro-optic medium such that the medium is in a clear state so that substantially all of the light is reflected by the mirror surface to the driver. However, if the photodetector senses "night" conditions and a second photodetector detects glare from a following vehicle, then, depending on the type of electro-optic material used, an electric field is or is not applied across the electro-optic medium such that the medium is selectively darkened, attenuating its ability to transmit light, such that undesired glare is substantially reduced.

It is known in the prior art to equip electro-optic mirrors with display systems to display information to the driver such as the time of day, ambient temperature, compass headings, and the like. Frequently, such mirror displays use illuminated displays that are viewed through the electro-optic medium or through a window created in the electro-optic medium. An alternate approach is disclosed in U.S. Pat. No. 5,189,537 to O'Farrell. The display system disclosed by this patent has an indicia defined by dielectric material positioned between the electro-optic medium and a conductive layer such that the electric field in the vicinity of the indicia is minimized. This causes the contrast between the indicia and the electro-optic medium to be maintained regardless of whether the mirror is in the day or night mode. This display system is limited, however, because it only provides a permanent, unchangeable display of the indicia pattern.

Thus, there exists a need for an electro-optic mirror display system capable of contrastingly displaying changing information, in either day or night conditions, and without the use of an illuminated display.

SUMMARY OF THE INVENTION

The electro-optic mirror display system of the present invention is capable of displaying changing information, in either day or night conditions, without the use of an illuminated display. The present invention is embodied in an electro-optic device having an electro-optic medium located between front and rear transparent conductive layers. In one embodiment, the electro-optic device is a mirror with a reflective layer positioned behind the rear conductive layer with its reflective surface facing forwardly towards the electro-optic medium. At least one, and preferably both of the conductive layers of this electro-optic device are patterned to define display elements. A display voltage source is coupled to individual display elements defining the display and creates an electric field of the same or opposite polarity of the electric field applied across the rest of the electro-optic medium in order to provide a contrasting display. This enables information displayed to be visible to the driver during "day" or "night" conditions of operation of the electro-optic mirror.

DETAILED DESCRIPTION OF THE EMBODIMENT

The electro-optic mirror display system of the present invention is capable of displaying any type of information, in either day or night conditions. Examples of information that may be displayed are time, temperature, compass headings, or paging messages. The display system is coupled to and works in conjunction with external electrical circuits that are capable of generating and supplying electrical signals including such information for display. The electro-optic display system of the present invention can be employed in any electro-optic device; however, one especially useful embodiment of the display system is for mirrors in the automotive environment. Within this specific environment, the preferred location for the display system is the rearview mirror of a vehicle which is positioned to the upper right of the driver and is in a convenient location for the driver to view displayed information.

Figure 1:
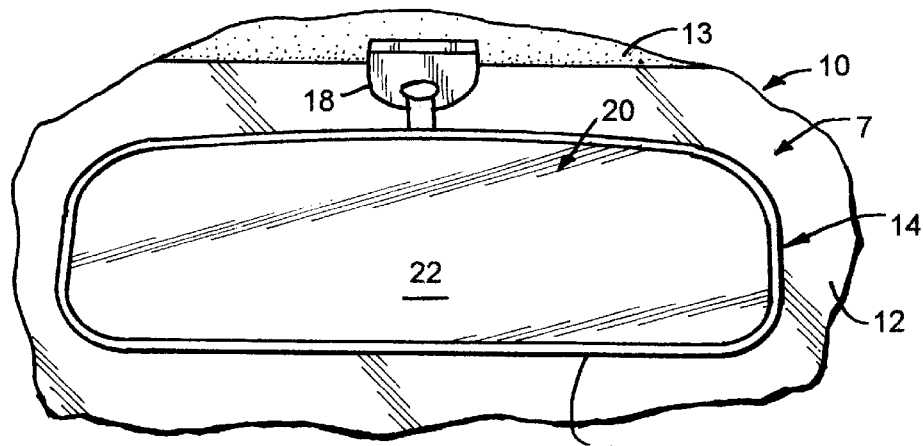
FIG. 1 is a fragmentary front elevational view of a rearview mirror for a vehicle such as an automobile and which embodies the present invention.

FIG. 1 shows a vehicle 10 such as an automobile. Mounted to the windshield 12 of the vehicle is a rearview mirror assembly 14 embodying the present invention. Assembly 14 includes a mirror housing 16 connected to the windshield 12 or roof 13 of a vehicle by a conventional mounting bracket 18. Housing 16 supports an electro-optical mirror 20 with a mirror viewing surface 22 which is adjustably positioned such that the driver can see the reflection of vehicles travelling behind the vehicle.

Figure 2:
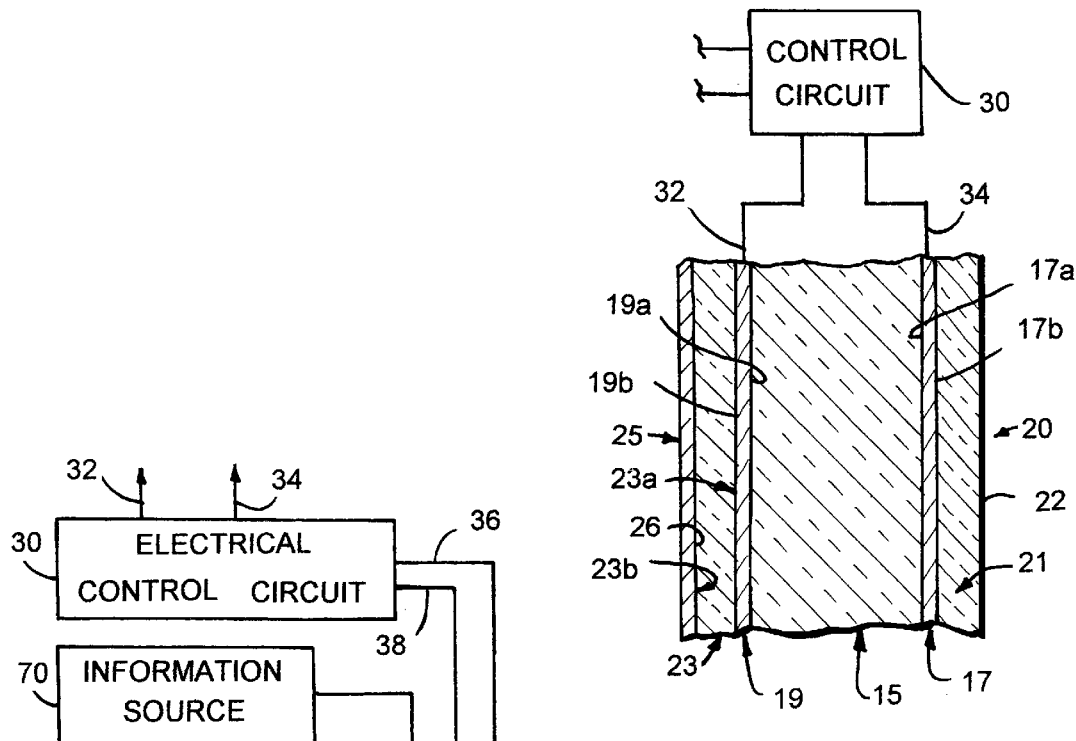
FIG. 2 is a greatly enlarged fragmentary vertical cross-sectional view of the internal structure of the electro-optic mirror shown in FIG. 1.

The mirror assembly 14 of the present invention is an electro-optic mirror 20 which, as seen in FIG. 2, includes an electro-optic medium 15, consisting of either electrochromic or polymer dispersed liquid crystal (P.D.L.C.) material, positioned between and attached to the first sides 17a and 19a of a front conductive layer 17 and a rear conductive layer 19, respectively. Any clear conductive material such as indium tin oxide (ITO) can be used for the conductive layers 17 and 19, the conductive layers being approximately fifteen hundred angstroms thick if ITO material is used. The thickness of the electro-optic medium is typically 50 to 150 microns if electrochromic material is used. If P.D.L.C. material is used, the thickness is typically eight to twelve microns. For purposes of the following operational description of the present invention, it is assumed that electrochromic material is used for electro-optic medium 15 such that the medium is normally in a clear state and is darkened by application of an electric field.

A front optically transparent substrate, or plate, 21 such as glass is attached to the second side 17b of the front conductive layer 17. The front surface of substrate 21 provides the mirror viewing surface 22 facing the driver. A rear optically transparent substrate, or plate, 23 such as glass has a first side 23a attached to the second side 19b of the rear conductive layer 19. The front and rear optically transparent substrates 21 and 23, respectively, can be made of glass or any optically clear plastic material. Attached to the second or outer side 23b of the rear substrate 23 is a reflective layer 25 having its reflective surface 26 facing forwardly toward the electro-optic medium 15 and the mirror viewing surface 22 to define the mirror so formed. The reflective layer 25 is typically of metallic material such as aluminum, chromium, stainless steel, or platinum. The electro-optic mirror includes an electrical control circuit 30 with output conductors 32 and 34 coupled to conductive layers 17 and 19 for supplying a control voltage to the layers 17 and 19 for changing the light transmissivity of the medium 15. Circuit 30 is conventional, and integrally includes a pair of photodetectors located in the mirror housing 16 and mirror itself to measure the ambient light and separately glare from the headlights of a trailing vehicle.

A typical electro-optic mirror having an electrochromic medium operates as a normal mirror when one of the photodetectors senses "day" ambient light driving conditions, with no electric field applied across the electrochromic medium. However, when the photodetector senses "night" driving conditions such that the ambient light is less than a predetermined threshold, and the second photodetector facing rearwardly senses light from the headlights of a trailing vehicle, the control circuit applies an electric field across the conductive layers 17 and 19 causing the electrochromic medium to darken and to transmit less light, thus reducing the amount of glare reflected to the driver by surface 26 under nighttime conditions. The display system of the present invention finds application within this typical electro-optic mirror structure and environment.

Figure 3:
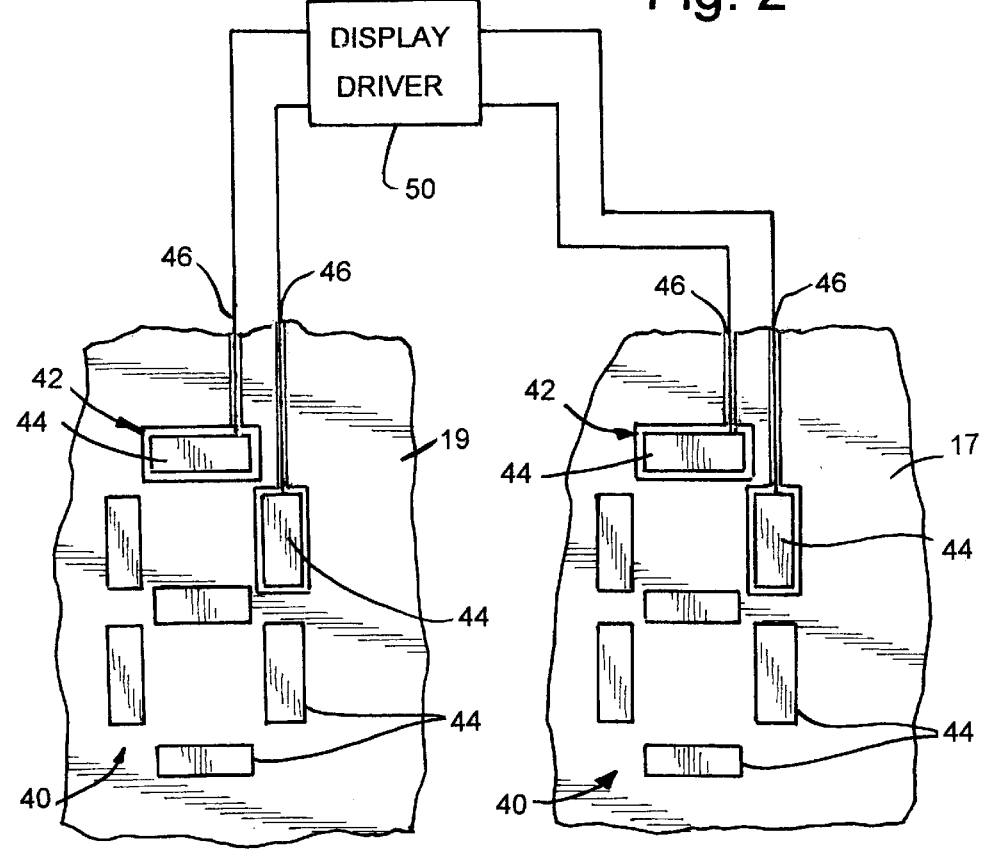
FIG. 3 is an enlarged fragmentary front elevational view of display patterns on the conductive layers of the electro-optic mirror display of the present invention showing the electrical circuit therefor in block form.

FIG. 3 shows in detail one pair of seven-segment displays 40 which are employed for the information display of the preferred embodiment of the present invention. Several such pairs of seven-segment displays are employed to provide the information desired in a given application. The size of the displays can be varied as desired as can their location on mirror surface 22 as long as they do not interfere with the use of this mirror 20 as a rearview mirror. Each display 40 also can have a desired pattern other than the traditional seven-segment array. Displays 40 are patterned on both the front conductive layer 17 and the rear conductive layer 19 of mirror 20, with each segment 44 of each display 40 defined by a non-conductive border 42. The patterning of each conductive layer is such that each segment 44 of each display 40 is aligned with a corresponding segment of a display on the other conductive layer to form matched pairs of displays 40 which align to form display 60 (FIGS. 4 and 5) when viewed by the driver via mirror viewing surface 22. Borders 42 also define thin conductors 46 (about 0.002 inch) for coupling each display element or pad 44 to a display driver 50.

There are several methods by which to pattern the non-conductive borders or paths 42 into the conductive layers 17 and 19. The preferred method is to use a laser to cut the pattern. Alternative methods include chemically etching the conductive layers or masking the adjoining optically transparent substrates before the conductive layers are applied to them. Non-conductive paths 42 are shaped to form individual display elements 44 that form a typical seven-segment display 40. In FIG. 3, the non-conductive paths 42 form all of the display segments 44 of the pair of displays 40, but formation of only four segments are shown for the sake of simplicity. The number and shape of the display elements can be varied depending on the type and amount of information that is to be displayed to the vehicle operator. In a preferred embodiment, the clock display 60 shown in FIGS. 4 and 5 is made up of four spaced seven-segment displays 40 on each conductive layer forming four aligned pairs of displays, with a pair of dots between the hour and minute digits.

Display elements 44 are rectangular segments of conductive material of the conductive layers 17 and 19 that are electrically isolated from each other as well as the rest of the conductive layers because they are enclosed within or outlined by the non-conductive paths 42. Each display element 44 of the matched pairs of displays 40 is individually coupled by conductors 46 to a display driver 50, shown in block form in FIG. 3, which supplies variable voltages to the elements. The conductive lines 46 are of limited width, and preferably are approximately 0.002 inch wide so as not to be visible to the user. FIG. 3 shows these conductors 46 greatly enlarged for purpose of illustrating this patterning of the conductive layers 17 and 19. A source 70 of information to be displayed is coupled to the display driver 50 which also receives day or night control signals from circuit 30 via conductors 36 and 38. The display driver 50 provides approximately one volt maximum signals to aligned segments 44 of matched pairs of displays 40 which creates either no electric field or an electric field across the aligned segments that is of the same or opposite polarity as that provided across the rest of mirror 20 in order to provide a contrasting display such as time display 60 under all light and glare conditions, as described in detail below. Circuit 50 may include a conventional integrated circuit display driver of the type used in LED display systems and voltage regulators such as an LM 317 circuit to provide the desired signal levels to the display from the vehicle's power system.

Figure 4:
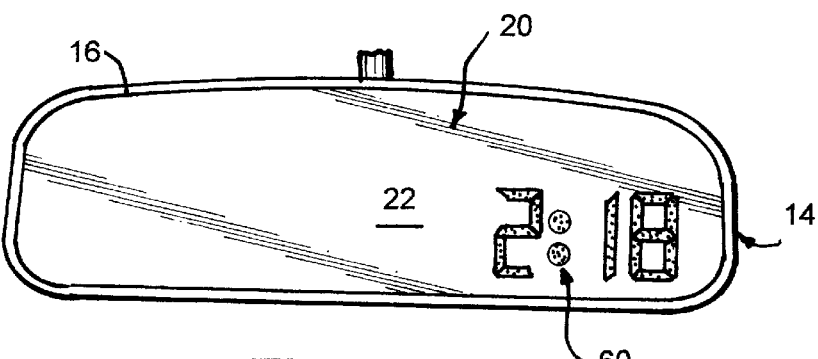
FIG. 4 is a front elevational view of the rearview mirror display of the present invention shown operating in the day-activated mode.
Figure 5:
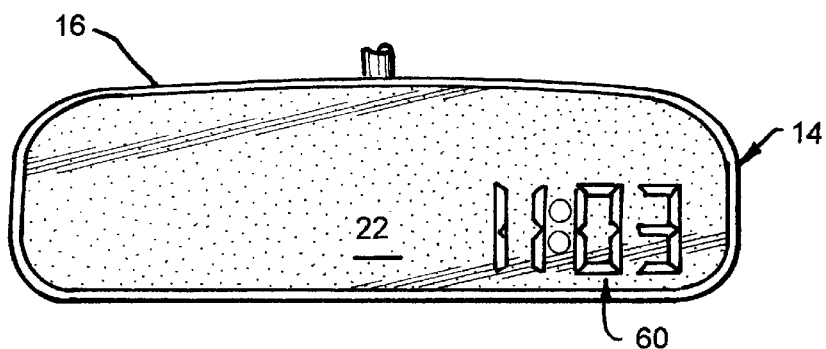
FIG. 5 is a front elevational view of the rearview mirror display of the present invention shown operating in the night-activated mode.

The source of information 70 may be any desired source in addition to the clock shown in FIGS. 4 and 5. One example is a digital compass of the type disclosed in U.S. Pat. No. 4,953,305.

FIG. 4 shows the rearview mirror 20 implementing the electro-optic mirror display system in its day-activated mode. In this mode of operation, the photodetector of circuit 30 senses light which prevents an electric field from being applied across the conductive layers 17 and 19 and the electrochromic medium. As a result, the mirror substantially operates as a normal mirror having a high degree of reflectivity. However, display driver 50 applies voltages to elements 44 such that an electric field is created across particular pairs of aligned display elements 44 of matched pairs of displays 40 that are selected by information source 70 and causes the electrochromic medium between the selected pairs of display segments 44 to darken. This electric field is of the same polarity as the electric field employed to darken mirror 20 when "night" glare conditions exist. The degree of darkening is varied by adjusting the level of the voltages applied to the segments which changes the strength of the electric field between the segments.

The contrast that is created with the rest of the electrochromic medium, including that between the nonselected display elements that do not have an electric field applied across them, takes the shape of the information to be communicated by the particular pairs of aligned display elements that are selected. The information displayed by these aligned display elements thus is visible to the driver via viewing surface 22. The conductive lines 46 (FIG. 3) used to apply voltages to particular display elements likewise create an electric field that, depending on their size, could potentially create a visible contrast. For this reason, the widths of the conductive connectors should be small enough such that any such contrast would be unnoticeable by the viewer of the display. In FIG. 4, for example, the display of the time is 2:18 p.m., although any desired information can be displayed by the system of the present invention. An electric field is applied across each pair of aligned display elements 44 of matched seven-segment displays 40 which are selected by the information source to display information with, for example, the five pairs of aligned elements of the hour digit forming the numeral "2" having an electric field applied across them to darken electrochromic medium 15 between the elements and, like the remaining portion of the conductive layers 17 and 19 of the mirror, the remaining two pairs of aligned elements of this digit have no electric field applied across them. The mirror shown in FIG. 1 operates as a normal mirror in which no display information is supplied by source 70. This mode is useful during daylight operating conditions when it is not desired to display information to the driver.

A second mode of operation is the night-activated mode. FIG. 5 depicts a rearview mirror 7 implementing the electro-optic mirror display system in its night-activated mode. In this mode, the photodetectors sense that the ambient light is less than a predetermined threshold and that oncoming glare exists. This enables the control circuit 30 to apply an electric field across the conductive layers 17 and 19 and the electrochromic medium to darken the medium 15 to reduce reflected glare to the driver. However, the display driver 50 applies a different electric field across particular pairs of aligned display elements 44 of display 60 that are selected by information source 70. This electric field has a polarity that is opposite to the electric field created by circuit 30 and counteracts the electric field across the electrochromic medium 15 created by circuit 30 and prevents the medium between the selected display elements from darkening and thus creates a contrasting display of the information to be displayed.

As noted above, the degree of contrast can be varied depending on the strength of the electric field applied across the aligned display elements 44 by the display driver 50. The pairs of aligned display elements 44 that are not selected by information source 70 to display information have an electric field applied across them by display driver 50 which is of the same polarity as the electric field applied across the rest of mirror 20 by circuit 30 such that the electrochromic medium between these elements is likewise darkened.

The information displayed by the selected pairs of display elements is viewed by the driver via viewing surface 22 because the higher reflectivity of the electrochromic medium in those areas reflects glare from surface 26 to provide a contrasting display. As seen in FIG. 5, the display is 11:00 p.m. with each of the hour's digits defined by an electric field of polarity opposite to that applied across the rest of mirror 20. Thus, to form the digit "1", the field applied across two pairs of vertically aligned segments 44 of a matched pair of seven-segment displays 40 is opposite the field applied to the remaining five pairs of aligned elements which have the same electric field applied across them as the electric field applied across the rest of mirror 20 by circuit 30.

The above operational description of the present invention is based on the embodiment in which electrochromic material is used for electro-optic medium 15. Operation of the embodiment in which P.D.L.C. material is used is similar to that described above, except that the mirror is normally in a darkened state when no electric field is applied across the electro-optic medium. Therefore, the appropriate mode of operation during which to apply a particular electric field across the electro-optic medium and/or selected pairs of aligned display segments 44 is opposite that which is appropriate if electrochromic material is used for electro-optic medium 15.

The above detailed description of the present invention focusses on the preferred embodiment in which displays 40 are patterned into both the front conductive layer 17 and the rear conductive layer 19. In alternative embodiments, only one of the conductive layers is patterned, it being preferable in such embodiments to pattern the rear conductive layer 19 because it reduces the likelihood of double imaging. The operation of such an alternative embodiment is essentially the same as when both conductive layers are patterned except that display driver 50 applies voltages to selected display segments 44 of only one conductive layer, creating an electric field between the selected segments and the other unpatterned conductive layer. This electric field may be of a less-defined shape than the electric field of the preferred embodiment which is focussed between aligned pairs of selected segments 44 of matched pairs of displays 40. This electric field, however, still provides the contrast needed to view the mirror display via mirror viewing surface 22, although display resolution may be less than that of the preferred embodiment.

It will be apparent to those skilled in the art that various modifications to the preferred embodiments of the invention described herein can be made without departing from the spirit or scope of the invention as defined by the appended claims.

What is claimed is:

1. An electro-optic display comprising:

a pair of spaced transparent conductive layers having an electro-optic medium between said layers;

a first voltage source for applying a first electric field across said conductive layers for changing the light transmission characteristics of said medium;

a display defined by individual conductive display elements patterned on one of said conductive layers each of said elements being surrounded by a non-conductive border; and a display driver coupled to each of said display elements for selectively applying voltages to individual ones of said display elements of said one conductive layer to create an electric field between said elements and said other conductive layer different than said first electric field to provide a contrasting display.

2. The electro-optic device of claim 1 wherein said electro-optic medium is an electrochromic material.

3. The electro-optic device of claim 1 wherein said electro-optic medium is a polymer dispersed liquid crystal material.

4. The electro-optic device of claim 1 wherein said conductive layers are formed of indium tin oxide.

5. The electro-optic device of claim 1 wherein said display is formed from a plurality of seven-segment displays.

6. An electro-optic display comprising:

a pair of spaced transparent conductive layers having an electro-optic medium between said layers;

a first voltage source for applying a first electric field across said conductive layers for changing the light transmission characteristics of said medium;

a display defined by individual conductive display elements patterned on both of said conductive layers, each of said elements surrounded by a non-conductive border; and a display driver and relatively thin conductors coupling said display driver to each of said display elements for creating an electric field across said display elements different than said first electric field to provide a contrasting display.

7. The electro-optic device of claim 6 wherein said electro-optic medium is an electrochromic material.

8. The electro-optic device of claim 6 wherein said electro-optic medium is a polymer dispersed liquid crystal material.

9. The electro-optic device of claim 6 wherein said conductive layers are formed of indium tin oxide.

10. The electro-optic device of claim 6 wherein said display is formed from a plurality of seven-segment displays.

11. An electro-optic mirror display system comprising:

front and rear conductive layers of transparent conductive material, wherein at least one of said conductive layers of material is patterned to form a display consisting of individual display segments of transparent conductive material surrounded by non-conductive borders;

an electro-optic medium positioned between and attached to said conductive layers, said medium capable of changing its light transmission characteristics when an electric field is applied across said conductive layers;

a first voltage source connected to said conductive layers;

a reflective layer attached to one of said optically transparent layers of conductive material to define a mirror; and a display driver connected to said individual display segments of said display for supplying voltages to said individual display segments that are selected by said display driver to provide a contrasting display.

12. The display as defined in claim 11 and further including a photodetector connected to said first voltage source, said photodetector enabling said first voltage source to apply an electric field across said conductive layers.

13. The electro-optic device of claim 11 wherein said electro-optic medium is an electrochromic material.

14. The electro-optic device of claim 11 wherein said electro-optic medium is a polymer dispersed liquid crystal material.

15. The electro-optic device of claim 11 wherein said conductive layers are formed of indium tin oxide.

16. The electro-optic device of claim 11 wherein said display is formed from a plurality of seven-segment displays.

17. An electro-optic mirror including an integral display comprising:

first and second parallel, spaced-apart transparent plates having facing conductive layers with an electro-optic medium therebetween such that application of a first electric field across said conductive layers changes the light transmission characteristics of said medium;

a reflective layer positioned behind one of said plates to define a mirror; and one of said conductive layers patterned to define at least one conductive display element which is electrically isolated by a border of non-conductive material from said one conductive layer such that a contrasting display is provided by said element when an electric field different than said first electric field is applied between said element and said other conductive layer.

18. The mirror display as defined in claim 17 wherein said one conductive layer includes a display comprising a seven-segment display pattern of seven conductive elements electrically isolated from each other.

19. The mirror display as defined in claim 18 and further including a plurality of spaced seven-segment display patterns.

20. The mirror display as defined in claim 19 and further including a display driver having a signal input, and output terminals coupled to each element of each of said seven-segment display patterns for displaying information applied to said input of said display driver.

21. The mirror display as defined in claim 20 and further including a source of information to be displayed, said source coupled to said signal input of said display driver.

22. An electro-optic mirror including an integral display comprising:

first and second parallel, spaced-apart transparent plates having facing conductive layers with an electro-optic medium therebetween such that application of a first electric field across said conductive layers changes the light transmission characteristics of said medium;

a reflective layer positioned behind one of said plates to define a mirror; and both of said conductive layers patterned to define conductive display elements which face one another and which are electrically isolated from said conductive layers by borders of non-conductive material such that a contrasting display is provided by said elements when an electric field different than said first electric field is applied between said elements.

23. The mirror display as defined in claim 22 wherein each of said conductive layers includes a display comprising a seven-segment display pattern of seven conductive elements electrically isolated from each other.

24. The mirror display as defined in claim 23 and further including a plurality of spaced seven-segment display patterns on each conductive layer.

25. The mirror display as defined in claim 24 and further including a display driver having a signal input, and output terminals coupled to each element of each of said seven-segment display patterns for displaying information applied to said input of said display driver.

26. The mirror display as defined in claim 25 and further including a source of information to be displayed, said source coupled to said signal input of said display driver.

27. An electro-optic display system comprising:

front and rear conductive layers of transparent conductive material, each layer having a first side and a second side, said conductive material patterned by non-conductive borders to define a display consisting of individual display elements of transparent conductive material in at least one of said conductive layers;

an electro-optic medium positioned between said first sides of said conductive layers, said medium capable of changing its light transmission characteristics when an electric field is applied across said conductive layers;

a front optically transparent substrate attached to said second side of said front conductive layer;

a rear optically transparent substrate having a first side and a second side, said first side attached to said second side of said rear conductive layer;

a reflective layer of material applied to said second side of said rear substrate to define a mirror; and thin electrical conductors patterned in said conductive material for coupling each of said display elements to a source of electrical signals representing information to be displayed which provides a different electrical field than said first named field to provide a contrasting display.

28. The electro-optic device of claim 27 wherein said electro-optic medium is an electrochromic material.

29. The electro-optic device of claim 27 wherein said electro-optic medium is a polymer dispersed liquid crystal material.

30. The electro-optic device of claim 27 wherein said conductive layers are formed of indium tin oxide.

31. The electro-optic device of claim 27 wherein said display is formed from a plurality of seven-segment displays.

32. An electro-optic rearview mirror and display for a vehicle comprising:

a rearview mirror housing for mounting to a vehicle; and a mirror assembly mounted within said housing, said assembly comprising first and second parallel, spaced-apart transparent plates having facing conductive layers with an electro-optic medium therebetween such that application of a first electric field across said conductive layers changes the light transmission characteristics of said medium, a reflective layer positioned behind one of said plates to define a mirror, wherein the improvement comprises one of said conductive layers patterned by a non-conductive border to define at least one conductive display element which is electrically isolated from said one conductive layer such that a contrasting display is provided by said element when an electric field different than said first electric field is applied between said element and said other conductive layer.

33. The rearview mirror display as defined in claim 32 wherein said one conductive layer includes a display comprising a seven-segment display pattern of seven conductive elements electrically isolated from each other.

34. The rearview mirror display as defined in claim 33 and further including a plurality of spaced seven-segment display patterns.

35. The rearview mirror display as defined in claim 34 and further including a display driver having a signal input, and output terminals coupled to each element of each of said seven-segment display patterns for displaying information applied to said input of said display driver.

36. The rearview mirror display as defined in claim 35 and further including a source of information to be displayed, said source coupled to said signal input of said display driver.

* * * * *